United States Patent [19]

Brünnemann et al.

[11] Patent Number: 5,916,938

[45] Date of Patent: *Jun. 29, 1999

[54] POLYACRYLATE RESIN SOLUTIONS HAVING IMPROVED COLOR NUMBER, AND THEIR USE IN COATING COMPOSITIONS

[75] Inventors: Michael Brünnemann; Heinz-Peter Rink; Harald Borgholte; Werner-Alfons Jung, all of Münster; Peter Hoffmann, Senden, all of Germany

[73] Assignee: BASF Coatings AG, Muenster-Hiltrup, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,135

[22] PCT Filed: Jul. 13, 1995

[86] PCT No.: PCT/EP95/02740

§ 371 Date: Jan. 15, 1997

§ 102(e) Date: Jan. 15, 1997

[87] PCT Pub. No.: WO96/03458

PCT Pub. Date: Feb. 8, 1996

[30] Foreign Application Priority Data

Jul. 25, 1994 [DE] Germany .............................. 44 26 323

[51] Int. Cl.$^6$ ............................... C08K 5/524; C08K 5/51

[52] U.S. Cl. .......................... 524/128; 524/115; 524/116; 524/117; 524/119; 525/326.5; 525/330.4; 525/340; 526/279

[58] Field of Search ...................................... 524/128, 116, 524/117, 119, 115; 525/330.4, 340

[56] References Cited

U.S. PATENT DOCUMENTS

| | | |
|---|---|---|
| 3,055,861 | 9/1962 | Hersh . |
| 5,006,578 | 4/1991 | Masuda ..................................... 524/128 |
| 5,276,097 | 1/1994 | Hoffmann .............................. 525/167 |
| 5,276,104 | 1/1994 | Hoffmann ............................. 525/329.5 |
| 5,483,004 | 1/1996 | Hoffmann ............................. 525/326.7 |

*Primary Examiner*—Fred Zitomer

[57] ABSTRACT

The present invention relates to a solution of a polyacrylate resin in one or more organic solvents, containing one or more phosphites, characterized in that the solution contains from 0.05 to 1.0% by weight, based on the solids content of the acrylate resin solution, of one or more phosphites and in that the phosphite has been added, either partially or entirely, after the polymerization reaction, at a temperature below the polymerization temperature.

The present invention further relates to coating compositions which contain these polyacrylate resin solutions, their use in processes for producing a multilayer protective and/or decorative coating on a substrate surface, and the use of the coating compositions in the automotive refinishing sector.

16 Claims, No Drawings

POLYACRYLATE RESIN SOLUTIONS HAVING IMPROVED COLOR NUMBER, AND THEIR USE IN COATING COMPOSITIONS

The present invention relates to a coating composition which contains organic solvent and is based on a solution of a polyacrylate resin (A) in one or more organic solvents, containing one or more organic phosphites.

The present invention further relates to the use of the coating compositions in processes for producing a multilayer, protective and/or decorative coating on a substrate surface, and to the use of the coating compositions as topcoats, in particular as transparent topcoats.

Multilayer coatings, especially two-coat metallic coatings, are produced principally by the basecoat/clearcoat process. This process is known and is described in, for example, U.S. Pat. No. 3,639,147 and EP-A-38 127.

The basecoat/clearcoat process can be used to prepare coatings which, in comparison with one-coat finishes, are distinguished by an improved effect and by the possibility of producing coatings having brighter and cleaner colors.

The basecoat which is initially applied determines, depending on the nature, quantity and spatial orientation of the pigments employed, the color and, if appropriate, the effect (e.g. metallic effect or pearlescent effect) of the coating.

After the basecoat has been applied, at least part of the organic solvents and/or at least part of the water is or are removed from the applied basecoat film in an evaporation phase. A nonaqueous, transparent topcoat is then applied to this pre-dried basecoat (wet-on-wet method). Subsequently, basecoat and topcoat are then dried together.

The transparent topcoat applied gives the two-coat finish gloss and fullness, and protects the applied pigmented coat against chemical and physical attack.

Important properties which the transparent topcoat obtained after the drying process is required to have are good adhesion to the basecoat, a good visual effect, high transparency, very good topcoat holdout, good gloss and good mechanical properties, such as hardness, mar-resistance and elasticity. The transparent topcoat obtained after the drying process must not least exhibit a high resistance to climatic effects (e.g. temperature fluctuations, moisture in the form of steam, rain, dew, the action of radiation, etc.) and to attack by acids or other chemicals, for example organic solvents.

In particular, the coating compositions employed as topcoat must, for visual reasons, have minimal inherent color (a color number which is as low as possible) so that, for example, changes in color are avoided in the case of light pearl-effect basecoats and metallic basecoats.

The production of coating compositions of minimal color number is possible when yellowing components are rigorously excluded from all of the components. Thus the polyacrylate resin solutions customarily employed at present for the production of transparent topcoats do indeed have a relatively low color number, but a further improvement is entirely desirable.

For example, DE-A-38 23 005, DE-A-35 34 874, DE-A-39 18 669 and DE-A-40 24 204 disclose coating compositions based on polyacrylate resin solutions.

Furthermore, German Patent Application P 44 07 409.3, which is not a prior publication, discloses coating compositions containing, as binder, a solution of a hydroxyl-containing polyacrylate resin which has been prepared using 4-hydroxy-n-butyl (meth)acrylate and/or 3-hydroxy-n-butyl (meth)acrylate as monomer component.

Finally, coating compositions known from German Patent Application P 44 07 415.8, which is not a prior publication, contain as binder a solution of a hydroxyl-containing polyacrylate resin which has been prepared using cycloaliphatic esters of (meth)acrylic acid and hydroxyl-containing monomers which are chosen such that polymerization of the OH monomers alone gives a poly(meth)acrylate resin having a glass transition temperature of from −10 to 6° C. or from 60 to 80° C.

With all of these specified coating compositions, however, a further improvement in the color number is entirely desirable. With this in mind, however, it must be ensured that the other properties of the coating compositions are not impaired.

EP-A-389 292 discloses aqueous coating compositions which are based on an aqueous dispersion of a carboxyl-containing acrylate copolymer and contain a trialkyl phosphite.

Furthermore, DE-C-3 422 668 discloses coating compositions containing esters of phosphorous acid as antiyellowing compositions.

Furthermore, it is known, for example, from DE-A-41 33 420, when preparing polyacrylate resins, to add together with the monomers small properties of triisodecyl phosphite. However, even in the case of the polyacrylate resin solutions obtained in this way, a further improvement in the color number is entirely desirable.

DE-B-27 49 576, furthermore, discloses the polymerization of glycidyl-containing acrylic resins in the presence of phosphites, the intention of which is to reduce the content of residual monomers. The acrylic resins thus obtained are employed in combination with aliphatic dicarboxylic acids as powder coating binders.

It is also known to employ phosphites—usually in combination with other antioxidants, especially phenolic antioxidants, or in combination with oxetanes or with siloxanes containing oxetane groups—as stabilizers or yellowing inhibitors in the synthesis of polyesters and for the stabilization of propylene polymers (cf. e.g. EP-B-228 837, EP-A-238 140 and DE-A-32 22 522).

Finally, DE-A-31 03 270 discloses the use in water-containing coating systems of a combination of antioxidants and complexing agents as a stabilizer against discolorations. The antioxidants employed in accordance with DE-A-31 03 270 are, in particular, phenothiazine and pyrocatechols and the like, whereas phosphites are not mentioned.

The object of the present invention is therefore to provide polyacrylate resin solutions having an improved color number which lead, when used in coating compositions, in particular in transparent topcoats, to coatings having good mechanical properties. The resulting coating compositions should in particular, when used as transparent topcoat, exhibit good adhesion to the basecoat, a good visual effect, high transparency, very good topcoat holdout, good gloss and good mechanical properties, such as hardness, mar-resistance and elasticity. The transparent topcoat obtained after the drying process must not least exhibit a high resistance to climatic effects (e.g. temperature fluctuations, moisture in the form of steam, rain, dew, the action of radiation, etc.) and to attack by acids or other chemicals, for example organic solvents.

This object is surprisingly achieved by a coating composition of the type mentioned at the outset, which is characterized in that the solution of the acrylate resin contains from 0.05 to 1.0% by weight, based on the solids content of the acrylate resin solution, of one or more organic phosphites and in that the solution of the polyacrylate resin can be prepared by adding the organic phosphite, either partially or entirely, after the polymerization reaction, at a temperature below the polymerization temperature.

The present invention further relates to the use of the coating compositions in processes for producing a multilayer, protective and/or decorative coating on a substrate surface, and the use of the coating compositions as topcoats, in particular as transparent topcoats, preferably for refinishing, the coating of plastics and the coating of heavy motor vehicles and truck bodies.

It is surprising, and was not foreseeable, that the use of from 0.05 to 1.0% by weight of one or more phosphites and the particular manner in which the phosphite is incorporated give polyacrylate resin solutions having a significant reduction, which is clearly recognizable visually, in the color number. In this context, it is particularly surprising and was not foreseeable that the color number of the polyacrylate resin solutions can be influenced by the manner in which the phosphite is incorporated. A further particular advantage is that the incorporation of the phosphite does not impair the other properties of coating compositions based on these polyacrylate resin solutions.

In the text below, the individual components of the coating composition according to the invention will first of all be described in more detail.

In accordance with the invention, by the addition of phosphite, all polyacrylate resins customarily employed for the production of coating compositions can be improved in respect of their color number. Suitable polyacrylate resins are, for example, those containing hydroxyl and/or carboxyl groups or amide groups or epoxide groups as crosslinking groups. In particular, however, hydroxyl- and/or carboxyl-containing polyacrylate resins are employed. It is preferred to employ hydroxyl-containing polyacrylate resins having an OH number of from 20 to 360 mg of KOH/g, preferably from 40 to 200 mg of KOH/g and an acid number of from 0 to 80 mg of KOH/g, preferably from 0 to 50 mg of KOH/g, and/or carboxyl-containing polyacrylate resins having an acid number of from 40 to 140 mg of KOH/g, preferably from 40 to 100 mg of KOH/g and an OH number of from 0 to 200 mg of KOH/g, preferably from 0 to 100 mg of KOH/g.

It is preferred to employ polyacrylate resins having a number-average molecular weight of not more than 10,000, and with particular preference those having a number-average molecular weight of from 1,000 to 5,000 (determined by gel permeation chromatography using polystyrene as calibration substance).

The polyacrylate resins can be prepared by the conventional processes such as, for example, solution polymerization, in the presence of an initiator and, if desired, in the presence of a polymerization regulator. The polymerization is normally carried out at temperatures from 100 to 180° C. Suitable initiators are peroxidic initiators, azo initiators and thermally labile compounds, based, for example, on highly substituted ethane derivatives.

In most cases the quantity of initiator is from 0.1 to 8% by weight, based on the quantity of monomer to be processed, but may also, if desired, be higher. The initiator, dissolved in a portion of the solvent employed for the polymerization, is metered in gradually during the polymerization reaction. The initiator feed preferably lasts from about 0.5 to 2 hours longer than the monomer feed, so as to achieve a good action during the post-polymerization phase as well. If initiators having only a low decomposition rate under the prevailing reaction conditions are employed, then it is also possible to include the initiator in the initial charge.

The polymerization conditions (reaction temperature, feed time of the monomer mixture, nature and quantity of the organic solvents and polymerization initiators, possible use of molecular weight regulators, for example mercaptans, thioglycolic esters and hydrogen chlorides) are selected such that the polyacrylate resins employed in accordance with the invention have a number-average molecular weight of not more than 10,000, preferably from 1,000 to 5,000 (determined by gel permeation chromatography using polystyrene as calibration substance).

For the preparation of the polyacrylate resins, all customarily employed monomers can be employed.

Suitable examples are cycloaliphatic esters of acrylic acid and/or methacrylic acid, such as cyclohexyl acrylate, cyclohexyl methacrylate, 4-tert-butylcyclo-hexyl acrylate, 4-tert-butylcyclohexyl methacrylate, isobornyl acrylate and isobornyl methacrylate. It is preferred to employ 4-tert-butylcyclohexyl acrylate and/or 4-tert-butylcyclohexyl methacrylate.

Additionally, for the preparation of the polyacrylate resins, hydroxyl-containing monomers such as, for example, hydroxyalkyl esters of $\alpha,\beta$-unsaturated carboxylic acids containing primary or secondary hydroxyl groups are suitable. If it is desired for the acrylate copolymer to be highly reactive, then exclusively hydroxyalkyl esters having primary hydroxyl groups can be employed; if the polyacrylate is to be less reactive, then exclusively hydroxyalkyl esters having secondary hydroxyl groups can be employed. It is of course also possible to use mixtures of hydroxyalkyl esters having primary hydroxyl groups and hydroxyalkyl esters having secondary hydroxyl groups.

Examples of suitable hydroxyalkyl esters of $\alpha,\beta$-unsaturated carboxylic acids containing primary hydroxyl groups are hydroxyethyl acrylate, hydroxy-propyl acrylate, hydroxybutyl acrylate, hydroxyamyl acrylate, hydroxyhexyl acrylate, hydroxyoctyl acrylate and the corresponding methacrylates. Examples which may be mentioned of hydroxyalkyl esters having a secondary hydroxyl group and which may be used are 2-hydroxybutyl acrylate, 3-hydroxybutyl acrylate and the corresponding methacrylates. It is of course also possible to employ in each case the corresponding esters of other $\alpha,\beta$-unsaturated carboxylic acids, for example of crotonic acid and of isocrotonic acid.

Advantageously, the hydroxyl-containing monomer may at least in part be a reaction product of one mole of hydroxyethyl acrylate and/or hydroxyethyl methacrylate and on average two moles of $\epsilon$-caprolactone. As hydroxyl-containing monomer, it is also possible to employ, at least in part, a reaction product of acrylic acid and/or methacrylic acid with the equivalent quantity of glycidyl ester of a carboxylic acid having a tertiary $\alpha$ carbon atom. Glycidyl esters of highly branched monocarboxylic acids are available under the trade name "Cardura". The reaction of the acrylic acid or methacrylic acid with the glycidyl ester of a carboxylic acid having a tertiary $\alpha$ carbon atom can be carried out before, during or after the polymerization reaction.

Also suitable, furthermore, are alkyl esters of ethylenically unsaturated carboxylic acids, for example alkyl esters of (meth)acrylic acid, crotonic and isocrotonic acid and of maleic acid. Examples of such monomers which may be mentioned are methyl (meth)acrylate, ethyl (meth)acrylate, butyl (meth)acrylate, tert-butyl (meth)acrylate, isopropyl (meth)acrylate, isobutyl (meth)acrylate, pentyl (meth)acrylate, isoamyl (meth)acrylate, hexyl (meth)acrylate, 2-ethylhexyl (meth)acrylate, furfuryl (meth)acrylate, octyl (meth)acrylate, 3,5,5-trimethylhexyl (meth)acrylate, decyl (meth)

acrylate, lauryl (meth)acrylate, hexadecyl (meth)acrylate, octadecyl (meth)acrylate, stearyl (meth)acrylate and ethyltriglycol (meth)acrylate.

Furthermore, aromatic vinyl compounds are also suitable. The aromatic vinyl compound preferably contains from 8 to 9 carbon atoms per molecule. Examples of suitable compounds are styrene, vinyltoluenes, α-methylstyrene, chlorostyrenes, o-, m- or p-methylstyrene, 2,5-dimethylstyrene, p-methoxy-styrene, p-tert-butylstyrene, p-dimethylaminostyrene, p-acetamidostyrene and m-vinylphenol. It is preferred to employ vinyltoluenes and, in particular, styrene.

Further suitable monomers are alkoxyethyl acrylates, aryloxyethyl acrylates and the corresponding methacrylates, for example butoxyethyl (meth)acrylate and phenoxyethyl (meth)acrylate, and methacrylonitrile and acrylonitrile, and alkyl esters of other ethylenically unsaturated carboxylic acids, for example alkyl esters of crotonic and isocrotonic acid, and polymerizable vinyl ethers and vinyl esters.

In combination with the other monomers mentioned it is also possible to employ polysiloxane macromonomers. Suitable polysiloxane macromonomers are those having a number-average molecular weight of from 1,000 to 40,000, preferably from 2,000 to 10,000, and having on average from 0.5 to 2.5 preferably from 0.5 to 1.5, ethylenically unsaturated double bonds per molecule. Suitable examples are the polysiloxane macromonomers described in DE-A 38 07 571 on pages 5 to 7, in DE-A 37 06 905 in columns 3 to 7, in EP-B 358 153 on pages 3 to 6 and in U.S. Pat. No. 4,754,014 in columns 5 to 9 and in the international patent application having the international publication number WO 92/22615 on pages 13 to 18. Furthermore, other acryloxysilane-containing vinyl monomers having the abovementioned molecular weights and contents of ethylenically unsaturated double bonds are suitable, for example compounds which can be prepared by reacting hydroxyfunctional silanes with epichlorohydrin and then reacting the reaction product with methacrylic acid and/or hydroxyalkyl esters of (meth)acrylic acid.

It is preferred to employ polysiloxane macromonomers of the following formula:

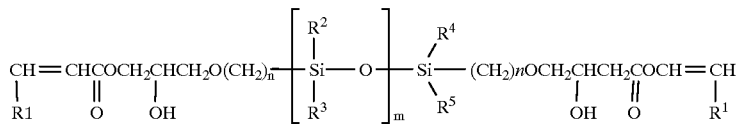

where $R^1$=H or $CH_3$ $R^2$, $R^3$, $R^4$, $R^5$ = identical or different aliphatic hydrocarbon radicals having 1 to 8 carbon atoms, in particular methyl, or phenyl radical.

n=from 2 to 5, preferably 3,

M=from 8 to 80 for example preferably the α, ω-acryloxy-organofunctional polydimethylsiloxane of the formula

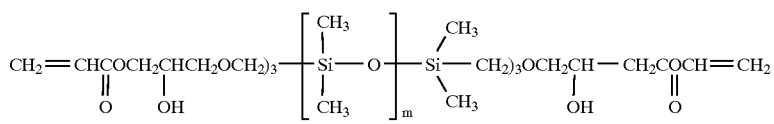

where m≈30 –50 is preferably employed.

The quantity of the polysiloxane macromonomer(s) employed is less than 5% by weight, preferably from 0.05 to 2.5% by weight, particularly preferably 0.05 to 0.8% by weight, based in each case on the overall weight of the monomers employed to prepare the polyacrylate.

Suitable examples of the polyacrylate resin are the hydroxyl-containing polyacrylate resins described in German Patent Application DE-A-40 24 204 and prepared in the presence of a polyester. For details, reference may be made to DE-A-40 24 204, in particular page 3, line 18, to page 7, line 53.

Also suitable are the hydroxyl-containing polyacrylate resins described in German Patent Application DE-A-38 23 005 on page 2, line 52, to page 6, line 19, and those described in German Patent Application DE-A-35 34 874 on page 4, line 43, to page 6, line 52.

Also suitable are the carboxyl-containing polyacrylate resins described in German Patent Application DE-A-39 18 669 on page 2, line 59, to page 7, line 2, and those described in German Patent Application DE-A-41 33 420 on page 2, line 61, to page 6, line 60. Additional examples of suitable polyacrylate resins are the polyacrylate resins which are commercially available under the name Macrynal® SM 510 and SM 513 from Hoechst and Synthalat® A 155 from Synthopol Dr. rer. pol. Koch GmbH & Co. KG.

Further suitable resins are the hydroxyl-containing polyacrylate resins which are described in German Patent Application P 44 07 415.8, which is not a prior publication, and which are obtainable by polymerizing ($m_1$) from 5 to 80% by weight, preferably from 5 to 30% by weight, of a cycloaliphatic ester of methacrylic acid and/or acrylic acid or of a mixture of such monomers, ($m_2$) from 10 to 50% by weight, preferably from 15 to 40% by weight, of a hydroxyl-containing alkyl ester of methacrylic acid and/or acrylic acid or of a mixture of such monomers, ($m_3$) from 0 to 25% by weight, preferably from 0 to 15% by weight, of a hydroxyl-containing, ethylenically unsaturated monomer which is different from ($m_1$) and ($m_2$), or of a mixture of such monomers, ($m_4$) from 5 to 80% by weight, preferably from 5 to 30% by weight, of an aliphatic ester of methacrylic and/or acrylic acid which is different from ($m_1$), ($m_2$) and ($m_3$), or of a mixture of such monomers, ($m_5$) from 0 to 40% by weight, preferably from 10 to 30% by weight, of an aromatic vinyl hydrocarbon which is different from ($m_1$), ($m_2$), ($m_3$) and (m4), or of a mixture of such monomers, and ($m_6$) from 0 to 40% by weight, preferably from 0 to 30% by weight, of a further ethylenically unsaturated monomer which is different from ($m_1$), ($m_2$), ($m_3$), ($m_4$) and ($m_5$), or of a mixture of such monomers, to give a polyacrylate resin having a number-average molecular weight Mn of from 1000 to 5000, a ratio of weight-average molecular weight Mw to number-average molecular weight Mn of less than 5.0, preferably from 1.8 to 4.0, and an OH number of from 60 to 180, preferably from 100 to 150, mg of KOH/g, the sum of the proportions by weight of the components ($m_1$) to ($m_6$) always being 100% by weight, using as component ($m_2$) only monomers or mixtures of monomers which, on polymerization of the respective monomer alone, give a polyacrylate and/or polymethacrylate resin having a glass transition temperature of from −10° C. to +6° C. or from +60° C. to 80° C.

The use of these polyacrylate resins leads to coating compositions which, when used as transparent topcoats, lead to coatings having, in particular, a degree of adhesion which is improved relative to conventional coating compositions.

As component ($m_2$) it is preferred to employ 3-hydroxypropyl methacrylate and/or 2-hydroxypropyl methacrylate and/or 3-hydroxypropyl acrylate and/or 2-hydroxypropyl acrylate. Examples of the monomers suitable as components ($m_1$) and ($m_3$) to ($m_6$) are the monomers described in the course of the description of the acrylate resin employed in accordance with the invention.

Also suitable are the polyacrylate resins which are described in German Patent Application P 44 07 409.3, which is not a prior publication, and which are obtainable by polymerizing (p1) from 10 to 51% by weight of a mixture of
  (p11) one or more monomers selected from the group 4-hydroxy-n-butyl acrylate and/or 4-hydroxy-n-butyl methacrylate and/or 3-hydroxy-n-butyl acrylate and/or 3-hydroxy-n-butyl methacrylate and
  (p12) one or more monomers selected from the group 3-hydroxy-n-propyl acrylate and/or 3-hydroxy-n-propyl methacrylate and/or 2-hydroxy-n-propyl acrylate and/or 2-hydroxy-n-propyl methacrylate,
(p2) from 0 to 20% by weight of a hydroxyl-containing ester of acrylic acid or of methacrylic acid, having at least 5 carbon atoms in the alcohol residue, which is different from (p1), or of a mixture of such monomers,
(p3) from 28 to 85% by weight of an aliphatic or cycloaliphatic ester of acrylic acid or of methacrylic acid, having at least 4 carbon atoms in the alcohol residue, which is different from (p1) and (p2), or of a mixture of such monomers,
(p4) from 0 to 25% by weight of an aromatic vinyl hydrocarbon which is different from (p1), (p2) and (p3), or of a mixture of such monomers,
(p5) from 0 to 5% by weight of an ethylenically unsaturated carboxylic acid or of a mixture of ethylenically unsaturated carboxylic acids, and
(p6) from 0 to 20% by weight of an ethylenically unsaturated monomer which is different from (p1), (p2), (p3), (p4) and (p5), or of a mixture of such monomers to give a polyacrylate resin having a hydroxyl number of from 60 to 200 mg of KOH/g, an acid number of from 0 to 35 mg of KOH/g an a number-average molecular weight of from 1000 to 5000, the sum of the proportions by weight of components (p1) to (p6) being in each case 100% by weight.

Examples of the compounds which are suitable as monomer components (p1) to (p6) are the compounds already listed above in the course of the description of the acrylate resin (A).

The use of these polyacrylate resins leads to coating compositions which, when used as transparent topcoat, lead to coatings having, in particular, a degree of adhesion which is improved relative to conventional coating compositions.

It is essential to the invention that the polyacrylate resin solutions contain from 0.05 to 1.0% by weight, preferably from 0.15 to 0.5% by weight, based in each case on the solids content of the polyacrylate resin solution, of one or more phosphites.

Suitable phosphites for use in the polyacrylate resin solutions are, for example, those described in DE-B-27 49 576, in DE-A-32 22 522 and in EP-B-228 837. Thus, for example, suitable phosphites are those of the general formula (I)

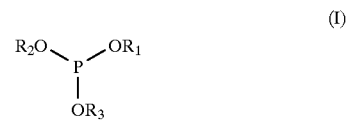

in which $R_1$, $R_2$ and $R_3$ are identical or different saturated aliphatic, linear or branched radicals having 1 to 18 carbon atoms, aryl radicals having 6 to 10 carbon atoms or arylalkyl radicals having 7 to 20 carbon atoms and $R_1$ may in addition denote hydrogen. Suitable phosphites of the general formula (I) are, for example, dimethyl phosphite, dibutyl phosphite, dilauryl phosphite, diphenyl phosphite, dinaphthyl phosphite, di(nonylphenol) phosphite, methyl octyl phosphite, cetyl phenyl phosphite, trimethyl phosphite, tributyl phosphite, tridecyl phosphite, tricetyl phosphite, triphenyl phosphite, trinaphthyl phosphite, tris (nonylphenol) phosphite, didecyl phenyl phosphite, methyl decyl phenyl phosphite, trioctadecyl phosphite, tris(2,4-di-t-butylphenyl) phosphite and the like. It is particularly preferred to employ triisodecyl phosphite.

Also suitable for use in the polyacrylate resin solutions are the phosphites described in DE-A-32 22 522, for example di(substituted) pentaerythrityl diphosphites of the general formula (II)

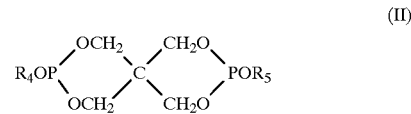

in which $R_4$ and $R_5$ are identical or different alkyl radicals having 1 to 30 carbon atoms, especially lauryl, palmitic and stearyl groups, and octadecyl radicals, cycloalkyl radicals having 5 to 14 carbon atoms or aryl radicals having 6 to 20 carbon atoms, which may also contain alkyl and/or hydroxyl substituents. Examples of such phosphites are dioctadecyl pentaerythrityl diphosphite and distearyl pentaerythrityl phosphite.

Also suitable, finally, are the phosphites described in DE-A-32 22 522 of the general formulae (III) and (IV)

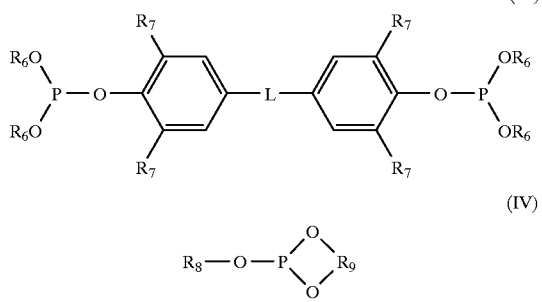

(III)

(IV)

in which $R_6$ is a substituted or unsubstituted aryl radical having 6 to 14 carbon atoms, $R_7$ is H or an alkyl radical having 1 to 4 carbon atoms and L is oxygen, an alkylidene radical having 1 to 6 carbon atoms or a single bond, $R_8$ is an alkylene radical having 2 to 5 carbon atoms or a divalent radical of a $C_6$–$C_{30}$-aryl ring system and $R_9$ has the same meaning as $R_4$, with the proviso that, of the possible radicals $R_8$ and $R_9$, in each case at least one carbon atom connected directly to the oxygen of the phosphorous acid is part of an aromatic ring.

These phosphites can be added to the coating compositions in a very wide variety of ways. In this context, however, it is essential to the invention that the phosphite be added, either partially or entirely, after the polymerization reaction, at a temperature below the polymerization temperature. The phosphites can advantageously be added to the solutions of the polyacrylate resins, after their preparation, at a temperature which is at least 20° C., preferably at least 25° C., below the polymerization temperature. The phosphites can therefore be added to the solutions of the polyacrylate resins, for example, after the polymerization reaction is over, at a temperature of not more than 115° C., preferably at a temperature of not more than 100° C. Furthermore, these phosphites can also be added to the solutions of the polyacrylates, either partially or else entirely, directly after or else not until one or more hours or days after their preparation, at room temperature.

It is particularly advantageous to add a portion of the phosphite together with the monomers directly in the polymerization. The remaining quantity of the phosphite is then added not until after the polyacrylate resin has been prepared, as described above. It is preferred to add not more than 85% by weight, particularly preferably from 80 to 30% by weight, of the overall quantity of phosphite in the polymerization reaction and to add the remaining quantity of the phosphite after the polymerization is over. This division of the quantities of phosphite maximizes the achievable reduction in color number.

The polyacrylate resin solutions according to the invention and the coating compositions produced using these polyacrylate resin solutions additionally contain one or more organic solvents. These solvents are commonly employed in quantities of from 20 to 70% by weight, preferably from 25 to 65% by weight, based in each case on the overall weight of the coating composition.

Examples of suitable solvents are aromatic compounds with relatively high levels of substitution, for example Solvent Naphtha®, heavy benzene, various Solvesso® grades, various Shellsol® grades and Deaso®, and relatively high-boiling aliphatic and cycloaliphatic hydrocarbons, for example various white spirits, mineral turpentine oil, tetralin and decalin, and various esters, for example ethylglycol acetate, butylglycol acetate, ethyldiglycol acetate and the like.

The polyacrylate resin solutions according to the invention are, in order to produce coating compositions, combined with appropriate crosslinking agents. The selection of these crosslinking agents is determined by the functional groups of the polyacrylate resin. If, for example, the polyacrylate resin has hydroxyl groups, then suitable crosslinking agents are, for example, isocyanates and/or amino resins, especially isocyanates.

The polyisocyanate component comprises any desired organic polyisocyanates containing aliphatically, cycloaliphatically, araliphatically and/or aromatically attached, free isocyanate groups. Preference is given to employing polyisocyanates having from 2 to 5 isocyanate groups per molecule. If desired, small quantities of organic solvent, preferably from 1 to 25% by weight based on pure polyisocyanate, may be added to the polyisocyanates in order thus to improve the ease of incorporation of the isocyanate. Examples of solvents suitable as additives for the polyisocyanates are ethoxyethyl propionate, butyl acetate and the like.

Examples of suitable isocyanates are described, for example, in "Methoden der organischen Chemie" [Methods of Organic Chemistry], Houben-Weyl, Volume 14/2, 4th edition, Georg Thieme Verlag, Stuttgart 1963, page 61 to 70, and by W. Siefken, Liebigs Ann. Chem. 562, 75 to 136. Suitable examples are 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, ω,ω,-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate ("isophorone diisocyanate"), 2,5- and 3,5-bis(isocyanatomethyl)-8-methyl-1,4-methano-decahydro-naphthalene, 1,5-, 2,5-, 1,6- and 2,6-bis(isocyanatomethyl)-4,7-methanohexahydroindane, 1,5-, 2,5-, 1,6- and 2,6-bis(isocyanato)-4,7-methanhexahydroindane, dicyclohexyl 2,4'- and 4,4'-diisocyanate, 2,4- and 2,6-hexahydrotolylene diisocyanate, perhydro-2,4'- and -4,4'-diphenylmethane diisocyanate, ω,ω'-diiso-cyanato-1,4-diethylbenzene, 1,3- and 1,4-phenylene diisocyanate, 4,4'-diisocyanato-biphenyl, 4,4'-diisocyanato-3,3'-dichlorobiphenyl, 4,4'-diisocyanato-3,3'-dimethoxy-biphenyl, 4,4'-diisocyanato-3,3'-dimethyl-biphenyl, 4,4'-diisocyanato-3,3'-diphenyl-biphenyl, 2,4,- and 4,4'-diisocyanato-diphenylmethane, naphthylene 1,5-diisocyanate, tolylene diisocyanates, such as 2,4- and 2,6-tolylene diisocyanate, N,N'-(4,4'-dimethyl-3,3'-diisocyanatodiphenyl)-uretdione, m-xylylene diisocyanate, dicyclohexylmethane diisocyanate, tetramethylxylylene diisocyanate, but also triisocyanates, such as 2,4,4'-triisocyanatodiphenyl ether, 4,4', 4"-triisocyanatotriphenylmethane. It is preferred to employ, if desired in combination with the abovementioned polyisocyanates, polyisocyanates containing isocyanurate groups and/or biuret groups and/or allophanate groups and/or urethane groups and/or urea groups. Polyisocyanates containing urethane groups, for example, are obtained by reacting some of the isocyanate groups with polyols, for example trimethylolpropane and glycerol.

It is preferred to employ aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, or mixtures of these polyisocyanates. Very particular preference is given to the use of mixtures of polyisocyanates which contain uretdione and/or isocyanurate groups and/or allophanate groups and which are based on hexa-methylene diisocyanate, as are formed by catalytic oligomerization of hexamethylene diisocyanate using appropriate catalysts. The polyisocyanate component (B) may in addition also consist of any desired mixtures of the polyisocyanates mentioned by way of example.

Alternatives which can also be employed, however, are the above-described isocyanates reacted with conventional capping agents, for example phenols, alcohols, acetoacetic esters, ketoxime- and ε-caprolactam. These combinations are stable at room temperature and, in general, cure only at temperatures above 100° C. In special cases, for example when using acetoacetic esters for capping, crosslinking may occur even at below 100° C.

The quantity of the crosslinking agent employed is chosen such that the ratio of the isocyanate groups of the crosslinking agent to the hydroxyl groups of the binder component is in the range from 1:3 to 3:1.

If the polyacrylate resins contain carboxyl groups as functional groups, then it is possible to employ as crosslinking agents, for example, epoxide compounds having at least 2 epoxide groups per molecule. Owing to the reduced tendency to yellowing, use is made in particular of aliphatic and/or alicyclic epoxy resins. In this context the crosslinking agent is normally employed in a quantity such that the ratio of the free carboxyl groups of the binder (acrylate copolymer plus, if appropriate, further carboxyl-containing polycondensation resin) to the epoxide groups of the epoxide resin is in the range from 1:3 to 3:1.

Examples of epoxy resins which are suitable as crosslinking agents are cycloaliphatic bisepoxides, epoxidized polybutadienes formed by reaction of commercial polybutadiene oils with peracids and/or organic acid/$H_2O_2$ mixtures, epoxidation products of naturally occurring fats, oils, fatty acid derivatives, modified oils, epoxide-containing novolaks, glycidyl ethers of a polyhydric alcohol, for example ethylene glycol diglycidyl ether, glycerol polyglycidyl ether, sorbitol polyglycidyl ether, trimethylolpropane polyglycidyl ether and pentaerythritol polyglycidyl ether, and suitable acrylate resins having oxirane side groups. Furthermore, it is also possible and advantageous to employ, as crosslinking agents, reaction products of hydroxyl-containing polyepoxides with di- or polyisocyanates, as are formed, for example, by reaction of OH-functional epoxides, for example sorbitol polyglycidyl ethers, with isophorone diisocyanate.

Also employed as preferred crosslinking agents are polar epoxides, based for example on a reaction product of melamine resins with acrylamide followed by epoxidation of acrylic double bonds. By way of example of this class of substance, mention may be made of the commercial product Santolink LSE 114 and Santolink LSE 120 from Monsanto, in which the epoxy resin base structure is a binuclear melamine, the number-average molecular weight is from about 1200 to 2000 and the epoxide equivalent weight is from about 300 to 350.

The coating compositions according to the invention customarily contain from 15 to 45% by weight of the acrylate resin and from 6 to 20% by weight of the crosslinking agent (B), based in each case on the overall weight of the coating composition and on the solids content of the binder components and crosslinking components.

The coating compositions produced using the polyacrylate resin solutions according to the invention may, furthermore, contain conventional auxiliaries and additives in conventional quantities, preferably from 0.01 to 10% by weight, based on the overall weight of the coating composition. Examples of suitable auxiliaries and additives are leveling agents, such as silicone oils, plasticizers, such as phosphates and phthalates, viscosity-regulating additives, matting agents, UV-absorbers and light stabilizers. The polyacrylate resin solutions may if desired also contain fillers and/or pigments in conventional quantities, preferably from 0 to 30% by weight, based on the overall weight of the coating composition.

The coating compositions are prepared in a known manner by mixing and, if appropriate, dispersing the individual components.

These coating compositions can be applied in the form of a film by spraying, flow coating, dipping, rolling, knife-coating or brushing to a substrate, the film subsequently being cured to give a firmly adhering coating.

These coating compositions are commonly cured at room temperature or slightly elevated temperature, preferably at slightly elevated temperature, and advantageously at temperatures below 120° C., preferably at temperatures below 80° C. and preferably at temperatures above 60° C. However, depending on the crosslinking agents employed, the coating compositions may also be cured under baking conditions, i.e. at temperatures of at least 120° C.

Particularly suitable substrates are metals and also wood, plastic, glass and the like.

Owing to the short curing times and low curing temperatures, the coating compositions according to the invention are preferably used for repair coating, especially automotive refinishing, the coating of heavy motor vehicles and truck bodies, and for the coating of plastics (curing in the range of 80–106° C. in particular). However, depending on the crosslinking agent employed, they may also be employed for the production-line finishing of automobiles. Furthermore, they are particularly suitable as clearcoats.

The present invention therefore also relates to a process for the production of a multilayer protective and/or decorative coating on a substrate surface, in which (1) a pigmented basecoat is applied to the substrate surface, (2) a polymer film is formed from the basecoat applied in step (1), (3) a transparent topcoat is applied to the basecoat thus obtained, and subsequently (4) basecoat and topcoat are cured together, characterized in that the topcoat employed is the coating composition according to the invention.

The basecoats employed in this process are known and therefore require no further description. Examples of suitable basecoats are also those basecoats described in DE-A 41 10 520, DE-A 40 09 000, DE-A-40 24 204, EP-A-355433, DE-A 35 45 618, DE-A 38 13 866 and in German Patent Application P 42 32 717.2, which is not a prior publication.

Also suitable are the basecoats described in German Patent Application P 43 27 416.1, which is not a prior publication, which are characterized in that they contain a hydroxyl-containing polyester having a weight-average molecular weight Mw of 40,000–200,000 and a polydispersity Mw/Mn>8 and in that, for the preparation of the polyester, at least 50% by weight of aromatic dicarboxylic acids or esterifiable derivatives thereof have been employed, but where the content of the phthalic anhydride is not more than 80% by weight and the percentages by weight are based in each case on the overall weight of the acid components employed in the preparation of the polyester.

Using the coating compositions according to the invention, it is also possible to apply coatings over oxidatively drying, pigmented oxidatively drying, and pigmented two-pack polyurethane coating materials, which are conventionally employed in the sector of single- or multilayer automotive refinishing. In this case too, coatings having the desired advantageous properties are obtained.

The invention is illustrated in more detail below with reference to working examples. All parts and percentages in these examples are by weight, unless expressly stated otherwise.

The preparation of the acrylate copolymers V1 to V5 and E1 to E8 was carried out in each case in a 4 liter stainless steel polymerization reactor with stirrer, reflux condenser, a monomer feed and an initiator feed. The components indicated in each case are weighed in, and then the initial charge is heated at 145° C.

All feeds are commenced at the same time; the monomer feed is metered in at a uniform rate over 4 h; the initiator feed is metered in at a uniform rate over 4.5 h. The initiator feed ends 30 minutes after the end of the monomer feed. During the polymerization, the temperature in the reactor is held at 142–145° C. Subsequently, polymerization is continued for 2 h. The temperature is then lowered to 120° C and the acrylate resin is diluted, if appropriate, with the stated solvent mixture to a solids content of 54%.

COMPARISON EXAMPLE 1

Initial charge:
  685.4 parts of Shellsol® A (commercial aromatic hydrocarbon mixture having a boiling range between 165 and 185° C., from Shell Chemie GmbH)
Monomer feed:
  460 parts (23%) of styrene
  120 parts (6%) of n-butyl methacrylate
  720 parts (36%) of hydroxypropyl methacrylate
  280 parts (14%) of tert-butylcyclohexyl acrylate
  420 parts (21%) of methyl methacrylate
  10 parts of mercaptoethanol
Initiator feed:
  43.6 parts of tert-butylcumyl peroxide
  194.7 parts of xylene
Solvent mixture for reducing the solids content after polymerization:
  487 parts of butyl acetate The polyacrylate resin V1 thus obtained has a solids content of 61.5% (1 h 130° C. with 2 parts of xylene), an acid number of 2.3 mg of KOH/g, an OH number of about 140 mg of KOH/g and a viscosity of 2.4 dPa.s (50% in butyl acetate at 23° C., ICI plate-cone viscometer).

EXAMPLE 1

In analogy to Comparison Example 1, a polyacrylate resin E1 is prepared, but with the difference that, after the end of the polymerization, at a temperature of 55° C., 4.0 parts (0.20%, based on the overall weight of the monomer mixture, of the initiator and of the regulator) of triisodecyl phosphite are added in addition.

The polyacrylate resin E1 thus obtained has a solids content of 57.8% (1 h 130° C. with 2 parts of xylene), an acid number of 1.6 mg of KOH/g, an OH number of 140 mg of KOH/g and a viscosity of 2.9 dPa.s (50% in butyl acetate at 23° C., ICI plate-cone viscometer).

EXAMPLE 2

In analogy to Example 1, a polyacrylate resin E2 is prepared, but with the difference that, after the end of the polymerization, at a temperature of 55° C., 5.0 parts (0.25%, based on the overall weight of the monomer mixture, of the initiator and of the regulator) of triisodecyl phosphite are added in addition.

The polyacrylate resin E2 thus obtained has a solids content of 57.8% (1 h 130° C. with 2 parts of xylene), an acid number of 1.6 mg of KOH/g, an OH number of about 140 mg of KOH/g and a viscosity of 2.9 dPa.s (50% in butyl acetate at 23° C., ICI plate-cone viscometer).

COMPARISON EXAMPLE 2

In analogy to Comparison Example 1, a polyacrylate resin V2 is prepared, but with the difference that, in the monomer feed, 4 parts (0.2%, based on the overall weight of the monomer mixture, of the initiator and of the regulator) of triisodecyl phosphite are weighed in addition.

The polyacrylate resin V2 thus obtained has a solids content of 62.4% (1 h 130° C. with 2 parts of xylene), an acid number of 2.0 mg of KOH/g, an OH number of about 140 mg of KOH/g and a viscosity of 4.0 dPa.s (50% in butyl acetate at 23° C., ICI plate-cone viscometer).

EXAMPLE 3

In analogy to Comparison Example 2, a polyacrylate resin E3 is prepared, but with the difference that, after the end of the polymerization, at a temperature of 55° C., 1.0 part (0.05%, based on the overall weight of the monomer mixture, of the initiator and of the regulator) of triisodecyl phosphite are added in addition.

The polyacrylate resin E3 thus obtained has a solids content of 61.7% (1 h 130° C. with 2 parts of xylene), an acid number of 1.2 mg of KOH/g, an OH number of about 140 mg of KOH/g and a viscosity of 3.6 dPa.s (50% in butyl acetate at 23° C., ICI plate-cone viscometer).

EXAMPLE 4

In analogy to Comparison Example 2, a polyacrylate resin E4 is prepared, but with the difference that, after the end of the polymerization, at a temperature of 100° C., 0.6 parts (0.03%, based on the overall weight of the monomer mixture, of the regulator and of the initiator) of triisodecyl phosphite are added in addition.

The polyacrylate resin E4 thus obtained has a solids content of 61.5% (1 h 130° C. with 2 parts of xylene), an acid number of 3.4 mg of KOH/g, an OH number of about 140 mg of KOH/g and a viscosity of 3.2 dPa.s (50% in butyl acetate at 23° C., ICI plate-cone viscometer).

COMPARISON EXAMPLE 3

In analogy to Comparison Example 2, a polyacrylate resin V3 is prepared, but with the difference that, instead of 4 parts, only 1.0 part (0.05%, based on the overall weight of the monomer mixture, of the regulator and of the initiator) of triisodecyl phosphite are weighed into the monomer feed.

The polyacrylate resin V3 thus obtained has a solids content of 61.9% (1 h 130° C. with 2 parts of xylene), an acid number of 3.5 mg of KOH/g, an OH number of about 140 mg of KOH/g and a viscosity of 3.3 dPa.s (50% in butyl acetate at 23° C., ICI plate-cone viscometer).

EXAMPLE 5

In analogy to Comparison Example 3, a polyacrylate resin E5 is prepared, but with the difference that, after the end of the polymerization, at a temperature of 100° C., 4.0 parts (0.2%, based on the overall weight of the monomer mixture, of the regulator and of the initiator) of triisodecyl phosphite are added in addition.

The polyacrylate resin E5 thus obtained has a solids content of 61.9% (1 h 130° C. with 2 parts of xylene), an acid number of 3.5 mg of KOH/g, an OH number of about 140 mg of KOH/g and a viscosity of 3.3 dPa.s (50% in butyl acetate at 23° C., ICI plate-cone viscometer).

COMPARISON EXAMPLE 4

In analogy to Comparison Example 1, a polyacrylate resin V4 is prepared, but with the difference that the following initiator feed is employed, with an azo initiator instead of a peroxidic initiator:
Initiator feed:
  41 parts of 2,2-azobis(2-methylbutanenitrile)
  196 parts of xylene The polyacrylate resin V4 thus obtained has a solids content of 61.7% (1 h 130° C. with 2 parts of xylene), an acid number of 1.2 mg of KOH/g, an OH number of about 140 mg of KOH/g and a viscosity of 3.6 dPa.s (50% in butyl acetate at 23° C., ICI plate-cone viscometer).

EXAMPLE 6

In analogy to Comparison Example 4, a polyacrylate resin E6 is prepared, but with the difference that, after the end of the polymerization, at a temperature of 55° C., 3.5 parts (0.17%, based on the overall weight of the monomer mixture, of the initiator and of the regulator) of triisodecyl phosphite are added in addition.

The polyacrylate resin E6 thus obtained has a solids content of 61.7% (1 h 130° C. with 2 parts of xylene), an acid number of 1.2 mg of KOH/g, an OH number of about 140 mg of KOH/g and a viscosity of 3.6 dPa.s (50% in butyl acetate at 23° C., ICI plate-cone viscometer).

COMPARISON EXAMPLE 5

Initial charge:
  1585 parts of Shellsol® A (commercial aromatic hydrocarbon mixture having a boiling range between 165 and 185° C., from Shell Chemie GmbH)
  1125 parts (25%) of Cardura® E10 (commercial glycidyl ester of Versatic acid from Shell Chemie GmbH)
Monomer feed:
  900 parts (20%) of methyl methacrylate
  1350 parts (30%) of styrene
  765 parts (17%) of hydroxyethyl methacrylate
  360 parts (8%) of acrylic acid
  22.5 parts of mercaptoethanol
Initiator feed:
  99 parts of tert-butylcumyl peroxide
  396 parts of xylene
Solvent mixture for reducing the solids content after polymerization:
  334 parts of xylene
  1429 parts of butyl acetate
  60 parts of butoxyl (commercial solvent based on methoxybutyl acetate from Hoechst AG)
  128 parts of butylglycol acetate The polyacrylate resin V5 thus obtained has a solids content of 54.5% (1 h 130° C. with 2 parts of xylene), an acid number of 9.0 mg of KOH/g, an OH number of about 125 mg of KOH/g and a viscosity of 12 dPa.s (original solution at 23° C., ICI plate-cone viscometer).

EXAMPLE 7

In analogy to Comparison Example 5, a polyacrylate resin E7 is prepared, but with the difference that, after the end of the polymerization, at a temperature of <60° C., 9.1 parts (0.20%, based on the overall weight of the monomer mixture, of the regulator and of the initiator) of triisodecyl phosphite are added in addition.

The polyacrylate resin E7 thus obtained has a solids content of 54.5% (1 h 130° C. with 2 parts of xylene), an acid number of 9.0 mg of KOH/g, an OH number of about 125 mg of KOH/g and a viscosity of 12 dPa.s (original solution at 23° C., ICI plate-cone viscometer).

EXAMPLE 8

In analogy to Example 7, a polyacrylate resin E8 is prepared, but with the difference that the 9.1 parts of triisodecyl phosphate are not added until 24 h after the preparation of the polyacrylate resin, at a temperature of 23° C.

The polyacrylate resin E8 thus obtained has a solids content of 54.5% (1 h 130° C. with 2 parts of xylene), an acid number of 9.0 mg of KOH/g, an OH number of about 125 mg of KOH/g and a viscosity of 12 dPa.s (original solution at 23° C., ICI plate-cone viscometer).

COMPARISON EXAMPLE 6

The preparation of the acrylate copolymers V6, V7, E9 and E10 was carried out in each case in a 4 liter stainless steel polymerization reactor with stirrer, reflux condenser, a monomer feed and an initiator feed.

The components indicated in each case are weighed in, and then the initial charge is heated at 142° C.

The initiator feed is begun 15 minutes before the monomer feed; the monomer feed is metered in at a uniform rate over 4 h; the initiator feed is metered in at a uniform rate over 4.75 h. The initiator feed ends 30 minutes after the end of the monomer feed. During the polymerization, the temperature in the reactor is held at 142° C. Subsequently, polymerization is continued for 2 h. The acrylate resin solution thus obtained has a solids content of 79%. The temperature is subsequently lowered to 120° C. and the acrylate resin is diluted with 767 parts of butyl acetate to a solids content of 60%.

Initial charge:
  222 parts of Shellsol® A (commercial aromatic hydrocarbon mixture having a boiling range between 165 and 185° C., from Shell Chemie GmbH)
  497 parts (27.8%) of Cardura® E10 (commercial glycidyl ester of Versatic acid from Shell Chemie GmbH)
Monomer feed:
  326 parts (18.2%) of methyl methacrylate
  462 parts (25.8%) of styrene
  359 parts (20.1%) of hydroxyethyl methacrylate
  145 parts (8.1%) of acrylic acid
  9 parts of mercaptoethanol
Initiator feed:
  61 parts of di-tert-butyl peroxide
  242 parts of xylene
Solvent mixture for reducing the solids content after polymerization:
  767 parts of butyl acetate The polyacrylate resin V6 thus obtained has a solids content of 60.4% (1 h 130° C. with 2 parts of xylene), an acid number of 6.1 mg of KOH/g, an OH number of 145 mg of KOH/g and a viscosity of 2.25 dPa.s (50% in butyl acetate at 23° C., ICI plate-cone viscometer).

EXAMPLE 9

In analogy to Comparison Example 6, a polyacrylate resin E9 is prepared, but with the difference that, after the end of the polymerization, at a temperature of <60° C., 3.65 parts (0.20%, based on the overall weight of the monomer mixture, of the regulator and of the initiator) of triisodecyl phosphite are added in addition.

The polyacrylate resin E9 thus obtained has a solids content of 60.4% (1 h 130° C. with 2 parts of xylene), an acid number of 6.1 mg of KOH/g, an OH number of about 145 mg of KOH/g and a viscosity of 2.3 dPa.s (50% in butyl acetate at 23° C., ICI plate-cone viscometer).

COMPARISON EXAMPLE 7

In analogy to Comparison Example 6, a polyacrylate resin V7 is prepared, but with the difference that the following initiator feed is employed:

Initiator feed:
61 parts of tert-butylcumyl peroxide
242 parts of xylene

The polyacrylate resin V7 thus obtained has a solids content of 59.2% (1 h 130° C. with 2 parts of xylene), an acid number of 6.0 mg of KOH/g, an OH number of about 145 mg of KOH/g and a viscosity of 2.9 dPa.s (50% in butyl acetate at 23° C., ICI plate-cone viscometer).

EXAMPLE 10

In analogy to Comparison Example 7, a polyacrylate resin E10 is prepared, but with the difference that, after the end of the polymerization, at a temperature of <60° C., 3.65 parts (0.20%, based on the overall weight of the monomer mixture, of the regulator and of the initiator) of triisodecyl phosphite are added in addition.

The polyacrylate resin E10 thus obtained has a solids content of 59.2% (1 h 130° C. with 2 parts of xylene), an acid number of 6.0 mg of KOH/g, an OH number of about 145 mg of KOH/g and a viscosity of 2.9 dPa.s (50% in butyl acetate at 23° C., ICI plate-cone viscometer).

The nature of addition and quantity added of the triisodecyl phosphite is summarized in Table 1. The determination of the color numbers of the resulting acrylate resin solutions is summarized in Table 2.

TABLE 1

Quantity added (in percent, based on the overall weight of the monomers employed, of the regulator and of the initiator) and nature of addition of the triisodecyl phosphite

| Example | Overall quantity | Boiling | at <60° C. | at 100° C. | at RT, 24 h |
|---|---|---|---|---|---|
| V1 | — | — | — | — | — |
| 1 | 0.2 | — | 0.2 | — | — |
| 2 | 0.25 | — | 0.25 | — | — |
| V2 | 0.2 | 0.2 | — | — | — |
| 3 | 0.25 | 0.2 | 0.05 | — | — |
| 4 | 0.23 | 0.2 | — | 0.03 | — |
| V3 | 0.03 | 0.03 | — | — | — |
| 5 | 0.23 | 0.03 | — | 0.2 | — |
| V4 | — | — | — | — | — |
| 6 | 0.17 | — | 0.17 | — | — |
| V5 | — | — | — | — | — |
| 7 | 0.20 | — | 0.20 | — | — |
| 8 | 0.20 | — | — | — | 0.20 |
| V6 | — | — | — | — | — |
| 9 | 02.0 | — | 0.20 | — | — |
| V7 | — | — | — | — | — |
| 10 | 0.20 | — | 0.20 | — | — |

TABLE 2

Results of the determination of colour number
The measurement is carried out with the UV/VIS NIT spectrometer (model CARY 5R) from VARIAN; cell: 1 cm, manufacturer: Hellma No. 110-QS, of quarter glass "SUPRA SIL"
The table shows the absorbance values at the wave lines 390 nm, 400 nm and 410 nm, each multiplied by a factor of 1000. The more negative the value, the greater the lighthening of the ssample. The baseline used is the sample indicated in each case.

| Example | Absorbance at 390 nm | Absorbance at 400 nm | Absorbance at 410 nm |
|---|---|---|---|
| V1 | 0 | 0 | 0 |
| V2 | −9.3 | −9.0 | −8.1 |
| 1 | −13.6 | −11.2 | −9.2 |
| 2 | −12.2 | −10.2 | −8.9 |
| 3 | −21.4 | −19.0 | −16.6 |
| V2 | 0 | 0 | 0 |
| 4 | −22.4 | −12.2 | −8.1 |
| V3 | 0 | 0 | 0 |
| 5 | −14.5 | −8.7 | −6.0 |
| V4 | 0 | 0 | 0 |
| 6 | −3.4 | −3.2 | −3.1 |
| V5 | 0 | 0 | 0 |
| 7 | −5.8 | −4.9 | −4.8 |
| 8 | −4.8 | −4.7 | −4.7 |
| V6 | 0 | 0 | 0 |
| 9 | −7.3 | −5.8 | −5.0 |
| V7 | 0 | 0 | 0 |
| 10 | −3.6 | −2.8 | −2.4 |

Summary of the test results

1.) The comparison of Comparison Example V1 with Comparison Example V2 showed an improvement in the color number on addition of triisodecyl phosphite in the boiling. The effect is intensified if triisodecyl phosphite is added not during the boiling but subsequently, after cooling to room temperature, or at elevated temperature, as shown by the comparison of Examples 1 and 2 with Comparison Example 2.

2.) A further significant improvement in the color number is obtained by dividing the quantity of triisodecyl phosphite into one portion which is added to the boiling and one portion which is added after the end of polymerization, after cooling to temperatures of below 115° C. Thus, the comparison of Example 3 with Example 2 shows a distinct improvement in the color number when one portion of the triisodecyl phosphite is added to the boiling. The comparison of Comparison Example 2 with Example 4 and with Example 2 shows that this method also gives a distinct improvement in the color number when the triisodecyl phosphite is added at 100° C. The comparison of Comparison Example V3 with Example 5 and of Comparison Example V2 with Example 4 shows that a certain quantity of triisodecyl phosphite can advantageously be added to the boiling.

3.) The comparison of Comparison Example V5 with Examples 7 and 8 shows a slight improvement in the color number when triisodecyl phosphite is added after the end of polymerization, in comparison to the addition of the triisodecyl phosphite 24 h after the end of the polymerization.

4.) Examples V4 and 6 and Comparison Examples V6 and V7 and Examples 9 and 10 indicate the transfer of the method to other initiators and monomer compositions.

EXAMPLE 11 AND COMPARISON EXAMPLE 8

Preparation of Clearcoats

1. Preparation of a Curing Agent Solution

The components indicated below are mixed to produce a curing agent solution:

| | |
|---|---|
| Butyl acetate 98% | 40.5 parts |
| Xylene | 4.0 parts |
| Butylglycol acetate | 6.0 parts |
| Catalyst solution | 1.5 parts |
| Desmodur ® Z 4370[1] | 15.0 parts |
| Desmodur ® N 3390[2] | 33.0 parts |
| Solids content (% by wt.) | 42.2 parts |

1) Commercial polyisocyanate from Bayer AG based on isophorone diisocyanate, having a solids content of 70% and an NCO content of 11%.
2) Commercial polyisocyanate from Bayer AG based on a hexamethylene diisocyanate trimer, having an average functionality of between 3 and 4 and a uretdione group content of between 0 and 3% by weight, and a solids content of 90% and an isocyanate content of 19.5%.

2. Preparation of a Diluent Additive

The components indicated below are mixed to produce a diluent additive:

| | |
|---|---|
| Xylene | 20.0 parts |
| Solventnaphta ® | 15.0 parts |
| Petroleum spirit 135/180 | 10.0 parts |
| Butylglycol acetate | 5.0 parts |
| Butyl acetate (98/100) | 50.0 parts |

3. Preparation of a Catalyst Solution 1.0 part of dibutyltin dilaurate is mixed with 99.0 parts of butyl acetate 98/100.

4. Preparation of a Leveling Agent Solution 5.0 parts of a commercial leveling agent based on a polyether-modified methylpolysiloxane (commercial product Baysilone® OL 17 from Bayer AG), 45 parts of butyl acetate 98/100 and 55.0 parts of xylene are mixed.

5. Preparation of the Clearcoat Solutions E1 and V1

The components indicated in Table 3 are mixed to prepare the clearcoat solutions.

6. Preparation of the Transparent Topcoats E1 and V1 (Comparison Example)

The transparent topcoats are prepared by mixing in each case 100 parts by volume of the clearcoat solution E1 or V1, respectively, with 50 parts by volume of the above-described curing agent solution and 10 parts by volume of the above-described diluent additive.

The coating material obtained in this way is then applied to phosphatized and coated steel panels. The phosphatized steel panels are coated for this purpose with a conventional commercial filler (commercial product Glasurit Grundfuller [primer surfacer] EP 801–1552 from Glasurit GmbH, Münster, containing an epoxy-functional binder and an amino-functional curing agent) by means of spray application (dry film thickness about 40 to 60 μm), dried at 80° C. for 45 min and 16 h at room temperature, and wet-sanded with sandpaper P800 and an eccentric sander. Subsequently, a basecoat is applied which comprises a mixture of 80 parts of a conventional commercial metallic basecoat (commercial product Basislack AE 54M 99/9 Basisfarbe Aluminium superfine from Glasurit GmbH, Münster) based on a hydroxyl-containing polyester, cellulose acetobutyrate, wax and a melamine resin, and 20 parts of a further conventional commercial basecoat (commercial product Basislack AE 54M 552 Basisfarbe Helioblau from Glasurit GmbH, Münster) based on a hydroxyl-containing polyester, cellulose acetobutyrate, wax and a melamine resin, by applying one spray pass first and, after an intermediate flash-off time of 5 min, applying a second spray pass (spray pressure in each case 4–5 bar). The dry film thickness of the basecoat is about 20 μm. After a flash-off time of 30 min the clearcoat is applied by first of all applying one spray pass and, after an intermediate flash-off time of 3 min, applying a second spray pass (spray pressure in each case 4–5 bar). The panels are then dried, depending on the test carried out, under different conditions. The dry film thickness of the clearcoat is about 50–80 μm.

The results of testing the resulting coatings are shown in Table 4.

TABLE 3

Composition of the clearcoat solutions, in parts

| Clearcoat | V1 | E1 |
|---|---|---|
| Acrylate V1[1] | 81.0 | — |
| Acrylate E4[1] | — | 81.0 |
| Tinuvin ® 292[2] | 1.2 | 1.2 |
| Tinuvin ® 1130[3] | 1.2 | 1.2 |
| Leveling agent[5] | 3.7 | 3.7 |
| Catalyst[4] | 1.8 | 1.8 |
| BGA[6] | 1.2 | 1.2 |
| Xylene | 5.0 | 5.0 |
| BAC[7] | 4.9 | 4.9 |

Explanations for Table 3

1) Acrylate resin solution E4 and V1 described in Table 1
2) Tinuvin® 292 from Ciba Geigy, commercial light stabilizer based on a sterically hindered amine (HALS)
3) Tinuvin® 1130 from Ciba Geigy, commercial light stabilizer based on benzotriazole
4) Catalyst solution described under item 3.
5) Leveling agent solution described under item 4.
6) Butylglycol acetate
7) Butyl acetate 98% strength

TABLE 4

Test results of the coating compositions/coatings

| | V1 | E1 |
|---|---|---|
| Yellowing | y. | s.y. |
| Dust dry | 2h 30 min | 2 h 20 min |

TABLE 4-continued

Test results of the coating compositions/coatings

|  | V1 | E1 |
|---|---|---|
| Tack-free | 4h 25 min | 4 h 25 min |
| Adhesion test | s.m. | s.m. |
| Volvo crack test | g0m0 | g0m0 |

Explanations for Table 4

The tests indicated in Table 4 are carried out as follows:
Yellowing:
  Visual assessment of the yellowing after storage (4 weeks at 50° C.):
  y=yellowed
  s.y.=very slightly yellowed
Dust dry time:
  About 15 minutes after the spray application of the coating material, a small sample of marine sand (3–4 g) is scattered on one corner of the panel. The panel is then dropped on one edge from a height of 30 cm (free fall). Dust dryness is attained when no sand adheres. The test is repeated at 15 minute intervals; shortly before dust dryness is attained, the repetition interval is shortened to 5 minutes.
Freedom from tack:
  About 20 minutes after dust dryness has been attained, the coated panel is covered with a piece of paper measuring about 3 cm². A small panel of rigid plastic is laid on this paper, and then a weight of 100 g is placed on the panel. After exactly 1 minute, testing is carried out as in the test for dust dryness to see whether the paper still adheres. Testing is repeated at 15 minute intervals; shortly before freedom from tack is attained, the repetition interval is shortened to 5 minutes.
Adhesion test:
  After flashing off the basecoats for 20 minutes, and storage of the panels at room temperature for 24 h in the case of chemically cured systems, a strip of Tesakrepp 4330 is stuck loosely onto the test panel, and is then pressed on by rolling a metal cylinder (about 7 cm long, about 6 cm wide, weighing about 1.5 kg) over it twice. After 1 hour, the tape is removed and evaluation is carried out on the basis of the severity of marking.
Evaluation:
  satisfactory: sat.,
  slightly marked: s.m.,
  marked: m,
  heavily marked: h.m.
Volvo crack test:
Test conditions 1 cycle:
  4 h at 50° in an oven
  2 h at 35° C. and 95–100% rel. atmospheric humidity
  2 h at 35° C. and 95–100% rel. atmospheric humidity and 2 l of sulfur dioxide
  16 h at −30° C. in a deep-freeze cabinet Wash panel with water and dry
Evaluation:
Degree of blistering in accordance with DIN 53209
Cracks ASTM d660

We claim:

1. A solvent borne coating composition having improved color, comprising a phosphite containing resin solution consisting of one or more organic solvents and a polyacrylate resin (A) resulting from the radical polymerization of one or more polyacrylate resin reactants at a polymerization temperature of greater than 130° C., the resin solution having from 0.05 to 1.0% by weight of one or more organic phosphites, based on the solids content of polyacrylate resin (A), wherein the resin solution is prepared by adding at least some portion of the organic phosphite to the polyacrylate resin after polymerization of the polyacrylate resin reactants and at a temperature of less than 130° C.

2. The solvent borne coating composition of claim 1 wherein the polyacrylate resin (A) results from the radical polymerization of polyacrylate resin reactants at a temperature of greater than 130° C., and the at least some portion of the organic phosphite is added to the polyacrylate resin after polymerization of the polyacrylate resin reactants at a temperature of not more than 120° C.

3. The solvent borne coating composition of claim 1, wherein the phosphite containing resin solution contains from 0.15 to 0.5% by weight of one or more organic phosphites, based on the solids content of polyacrylate resin (A).

4. The solvent borne coating composition of claim 1, wherein the phosphite containing resin solution contains at least one organic phosphite of the formula (I)

$$R_2O\diagdown_P\diagup OR_1 \atop | \atop OR_3 \qquad (I)$$

in which $R_1$, $R_2$ and $R_3$ are identical or different saturated, aliphatic, linear or branched radicals having 1 to 18 carbon atoms, aryl radicals having 6 to 10 carbon atoms or aralkyl radicals having 7 to 20 carbon atoms and $R_1$ may additionally denote H.

5. The solvent borne coating composition of claim 4, wherein the phosphite containing resin solution contains one or more organic phosphites selected from the group consisting of

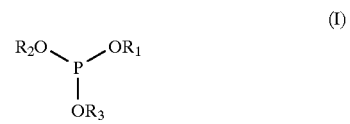

(III)

(IV)

and mixtures thereof,
in which $R_4$ and $R_5$ are identical or different alkyl radicals having 1 to 30 carbon atoms, cycloalkyl radicals having 5 to 14 carbon atoms or aryl radicals having 6 to 20 carbon atoms, which may also contain alkyl and/or hydroxyl substituents, $R_6$ is a substituted or unsubstituted aryl radical having 6 to 14 carbon atoms, $R_7$ is H or an alkyl radical having 1 to 4 carbon atoms and L is oxygen, an alkylidene radical having 1 to 6 carbon atoms or a single bond, $R_8$ is an alkylene radical having 2 to 5 carbon atoms or a divalent radical of a $C_6$–$C_{30}$-aryl ring system and $R_9$ has the same meaning as $R_4$, with the proviso that, of the possible radicals $R_8$ and $R_9$, in each case at least one carbon atom connected directly to the oxygen of the phosphorous acid is part of an aromatic ring.

6. The solvent borne coating composition of claim 1 wherein the phosphite containing resin solution contains triisodecyl phosphite.

7. The solvent borne coating composition of claim 1 wherein the phosphite containing resin solution is prepared by adding at least some portion of the organic phosphite to the polyacrylate resin at a temperature which is not more than 100° C.

8. The solvent borne coating composition of claim 1 wherein the phosphite containing resin solution is prepared by adding not more than 85% by weight of the total quantity of the organic phosphite during the polymerization of the polyacrylate resin reactants and adding at least 15% by weight of the overall quantity of the organic phosphite after the polymerization of the polyacrylate resin reactants.

9. The solvent borne coating composition of claim 1 wherein the polyacrylate resin (A) has a number-average molecular weight of not more than 10,000, and contains a crosslinking group selected from the group consisting of hydroxyl, carboxyl, epoxide and amide groups, and mixtures thereof.

10. The solvent borne coating composition of claim 9, wherein polyacrylate resin (A) comprises a hydroxyl-containing acrylate resin and a carboxyl-containing acrylate resin, wherein the hydroxyl-containing acrylate resin has an OH number of from 20 to 360 mg of KOH/g, and an acid number of from 0 to 80 mg of KOH/g and the carboxyl-containing acrylate resin has an acid number of from 40 to 140 mg of KOH/g, and an OH number of from 0 to 200 mg of KOH/g.

11. The solvent borne coating composition of claim 9, wherein the polyacrylate resin (A) contains polysiloxane macromonomers in copolymerized form.

12. The solvent borne coating composition according to claim 11, characterized in that it is cured at temperatures below 120° C.

13. A process for producing a multilayer, protective and/or decorative coating, comprising (1) applying a pigmented basecoat to a substrate surface, (2) forming a polymer film from the basecoat applied in step (1), (3) applying a transparent topcoat to the basecoat thus obtained, and subsequently (4) curing the basecoat and topcoat together, wherein the topcoat employed is a solvent borne coating composition according to claim 1.

14. The solvent borne coating composition of claim 9 wherein the polyacrylate resin (A) has a number-average molecular weight of between 1,000 and 5000, and contains a crosslinking group selected from the group consisting of hydroxyl, carboxyl, epoxide and amide groups, and mixtures thereof.

15. The solvent borne coating composition of claim 1 wherein the resin solution is prepared by adding from 20 to 70% by weight of the overall quantity of the organic phosphite after the polymerization.

16. A transparent topcoat composition having an improved color number, comprising as a binder a phosphite containing resin solution consisting of one or more organic solvents and a polyacrylate resin (A) resulting from the radical polymerization of polyacrylate resin reactants at a polymerization temperature of greater than 130° C., the resin solution having from 0.05 to 1.0% by weight of one or more organic phosphites, based on the solids content of polyacrylate resin (A), wherein the resin solution is prepared by adding at least some portion of the organic phosphite to the polyacrylate resin after radical polymerization of the polyacrylate resin reactants and at a temperature less than 130° C.

* * * * *